Jan. 26, 1965  E. C. SCANLON  3,166,794
PLASTIC MOLDING MACHINE
Filed Feb. 7, 1964  6 Sheets-Sheet 1
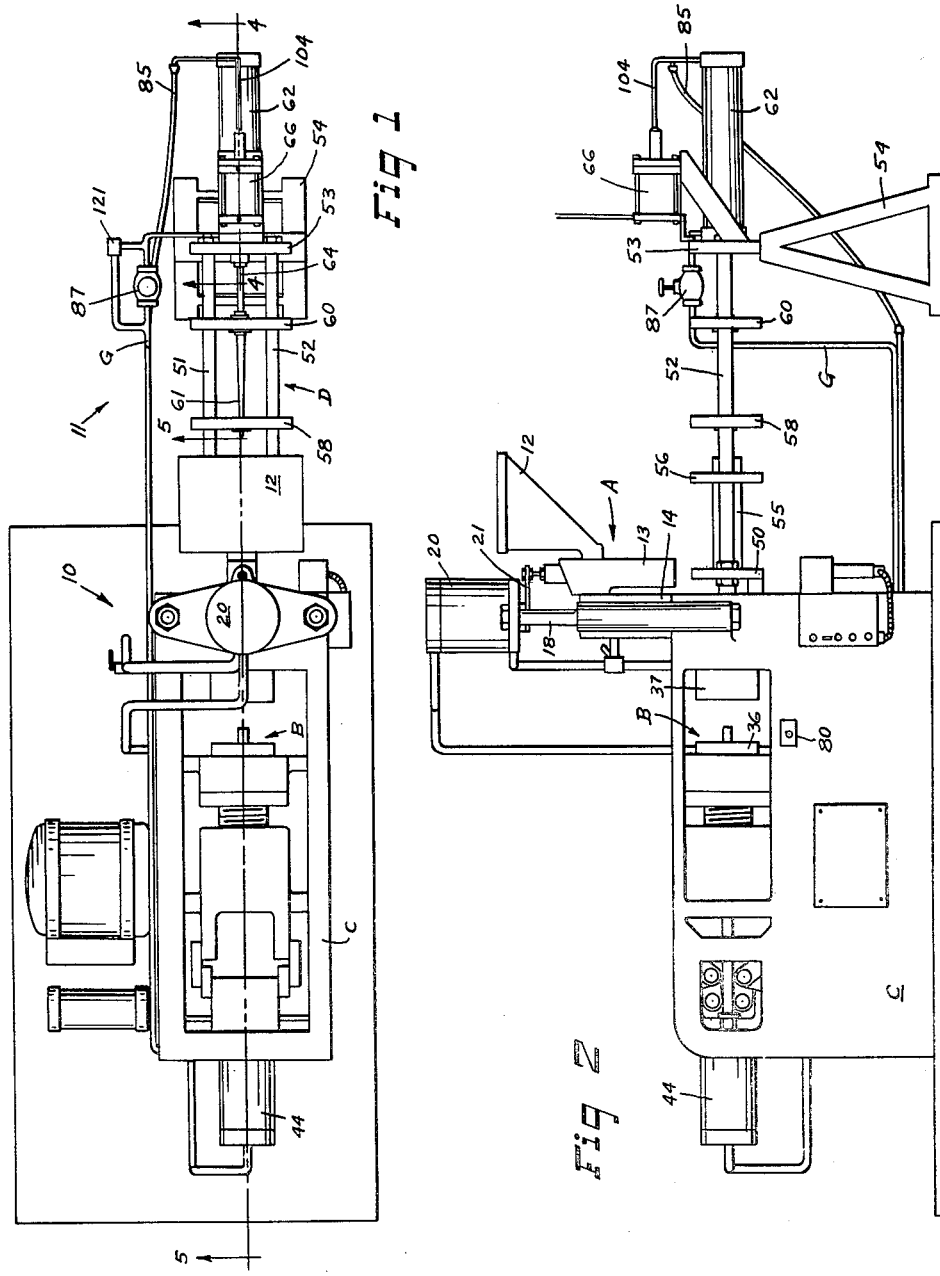
INVENTOR.
EDWARD CHARLES SCANLON
BY
William Frederick Werner
ATTORNEY Jan. 26, 1965 E. C. SCANLON 3,166,794
PLASTIC MOLDING MACHINE
Filed Feb. 7, 1964 6 Sheets-Sheet 2
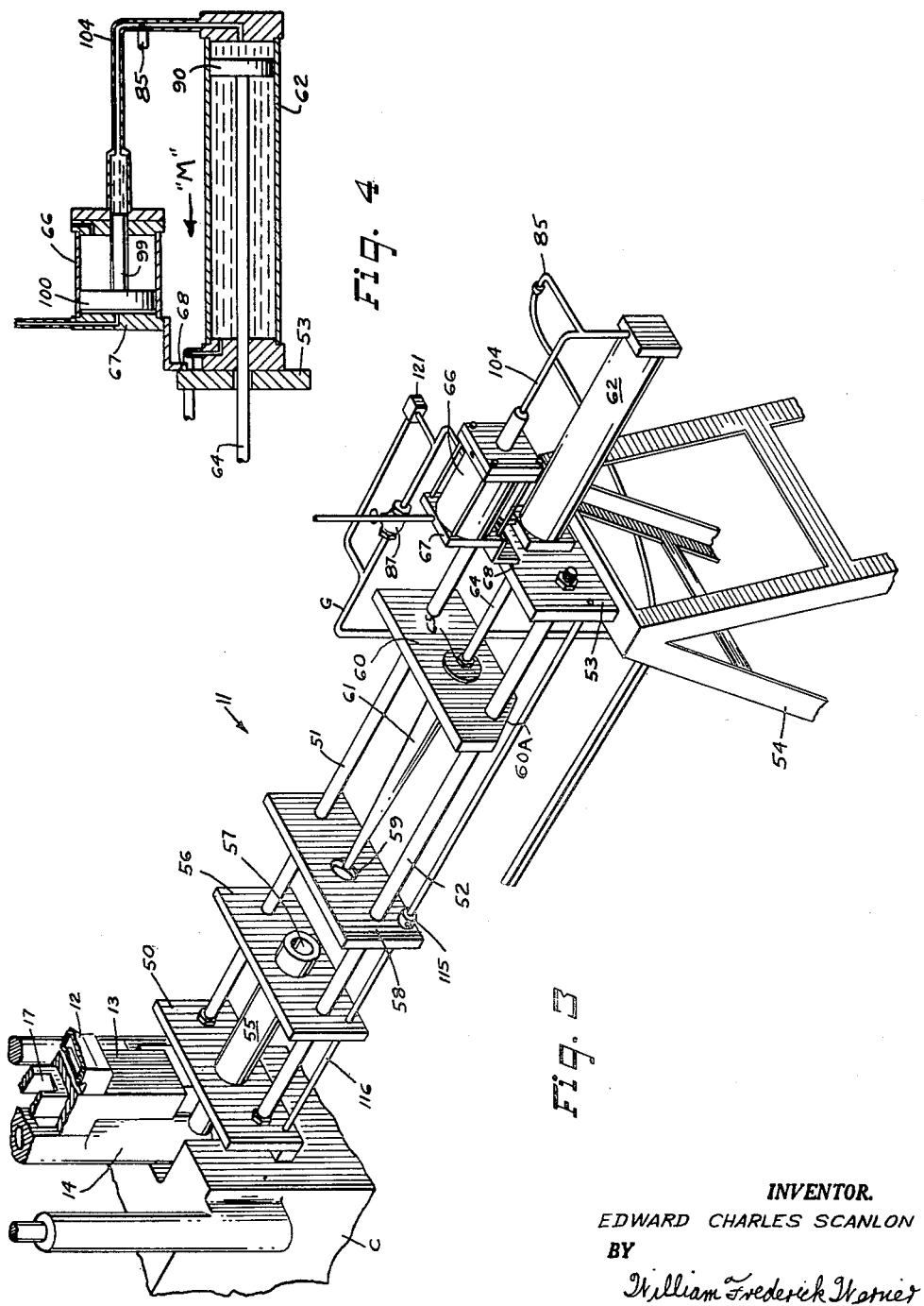
INVENTOR.
EDWARD CHARLES SCANLON
BY
William Frederick Warner
ATTORNEY

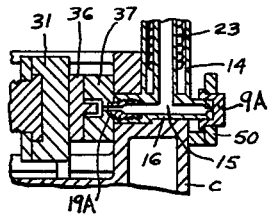
Fig 8
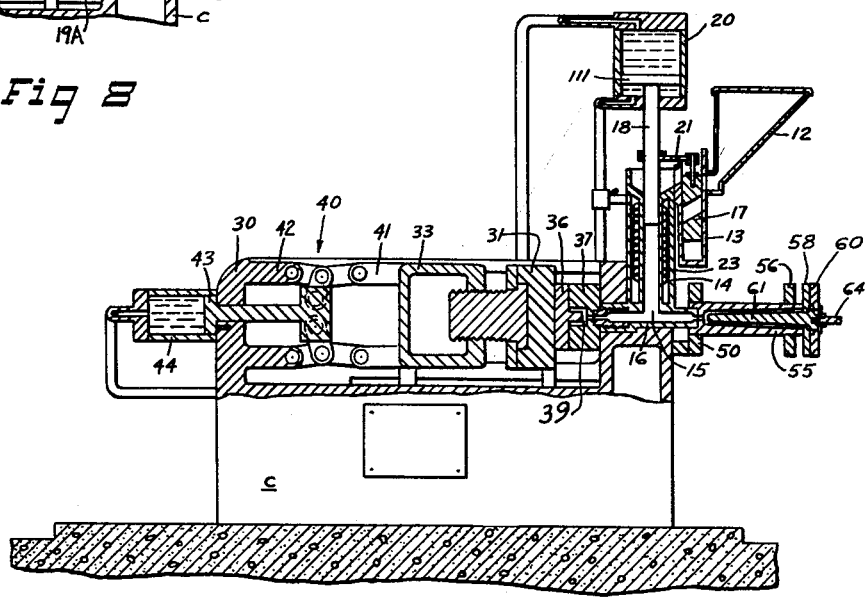
Fig 7
Fig 10
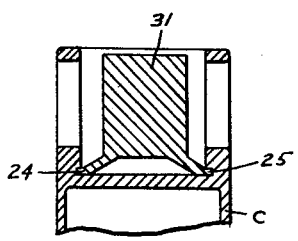
Fig 9
Fig 11
INVENTOR.
EDWARD CHARLES SCANLON
BY
William Frederick Werner
ATTORNEY INVENTOR.
EDWARD CHARLES SCANLON
BY
William Frederick Werner
ATTORNEY Jan. 26, 1965   E. C. SCANLON   3,166,794
PLASTIC MOLDING MACHINE
Filed Feb. 7, 1964   6 Sheets-Sheet 6

INVENTOR.
EDWARD CHARLES SCANLON
BY
William Frederick Werner
ATTORNEY

United States Patent Office 3,166,794
Patented Jan. 26, 1965

3,166,794
PLASTIC MOLDING MACHINE
Edward C. Scanlon, 13 Richmond Ave.,
West Barrington, R.I.
Filed Feb. 7, 1964, Ser. No. 343,248
7 Claims. (Cl. 18—30)

This invention relates to plastic molding machines and more particularly to a horizontal auxiliary long stroke attachment operatively connected to a horizontal short stroke parent plastic ejection molding machine.

One of the objects of the present invention is to provide an ejection molding machine with the versatility and dual function of a short stroke and a long stroke molding operation.

Another object of the present invetnion is to provide an auxiliary attachment to a standard ejection molding machine whereby the hopper feeding apparatus and control are used for both the standard machine and the auxiliary attachment.

Still another object of the present invention is to provide means to strip a molded product of major length from a molding core.

In the past ejection molding machines were provided with a hopper, a dry plastic pellet material feeding elevator and a heating cylinder. A plunger in the feeding elevator fed the correct amount of dry pellet material into the heating cylinder where the pellets were converted into a fluid. The fluid was fed by means of a hydraulic piston into a mold provided with a movable core. The article, in the present instance, a furniture leg, was molded around the core. In the cycle of operation the core carrying the molded product was withdrawn from the mold a distance equal to twice the length of the molded product. One length of the distance was devoted to removing the molded product from the core. The prior art molding machines were limited in the length of product which could be molded.

Increasing the distance the core would travel presented many problems. One problem was a means of maintaining the core in absolute parallel alignment in its reciprocating travel toward and away from the mold.

Another problem was; how to provide an increase in the pressure necessary to force the fluid into the larger molding cavity. Another problem was; what means to provide to strip the molded product off the core without disturbing the parallel alignment of the traveling core?

Other problems were; how to increase the clamping pressure of the mold and how to provide an adjustable stroke or travel for the core.

As will hereinafter appear the present invention overcomes all of these problems and other problems, as they are presented in the following specification. It would appear as if a whole new machine would be needed to mold a long core article. Such a machine would be very large and strictly limited to long core articles. The present invention permits a short stroke molding machine to function in its usual way. If a long stroke core is needed minor rapid adjustments can be made to the standard short stroke mechanism to operate the long stroke mechanism. Thus the present invention provides for a long stroke core inexpensively, and without disturbing the much more rapid function and production of the short stroke molding machine.

Other objects of the present invention will become apparent in part and be pointed out in part in the following specification and claims.

This application is a continuation-in-part of U.S. patent application Serial No. 145,600, filed October 17, 1961, and now abandoned.

Like reference numerals refer to like parts in the following drawings, in which:

FIGURE 1 is a plan view of the short stroke plastic molding machine provided with a long stroke auxiliary attachment.

FIGURE 2 is a side elevational view of FIGURE 1.

FIGURE 3 is a perspective view of the long stroke auxiliary attachment.

FIGURE 4 is a fragmentary transverse cross sectional view taken along line 4—4 of FIGURE 1.

FIGURE 7 is a view similar to FIGURE 5 showing the cores moved into molding position.

FIGURE 8 is a fragmentary cross sectional view showing the long stroke mold blocked off.

FIGURE 9 is a fragmentary cross sectional view taken along line 9—9 of FIGURE 5.

FIGURE 10 is a perspective view of a product produced by the long stroke molding auxiliary attachment.

FIGURE 11 is a perspective view of a product produced by the short stroke molding machine.

Figure 5:
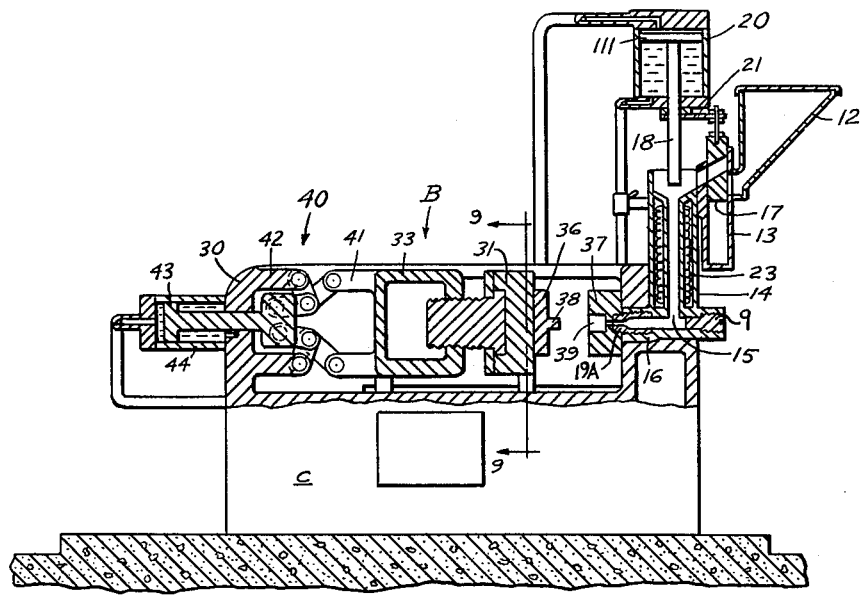
FIGURE 5 is a fragmentary transverse cross sectional view taken along line 5—4 of FIGURE 1, showing the long stroke mold blocked off.

Referring to the drawings, wherein reference numeral 10, generally, indicates a standard short stroke plastic molding machine, and reference numeral 11, generally, indicates the long stroke auxiliary attachment.

Referring to FIGURES 1 through 11, the apparatus of the molding machine 10 comprises a material feed and conditioning assembly or injection unit A, and a molding or press B, for hydraulic operation. The injection unit A is mounted on a base C. Base C is adapted to house and support the actuating and control system. The latter preferably hydraulic and either self-contained or associated with an outside or central power source. The molding press B is reciprocatingly supported in the housing or base C. The auxiliary attachment 11 with which this invention is mainly concerned is supported by a separable frame element indicated generally at D and is secured on one end to housing or base C.

The material conditioning and injection unit may be of any preferred type. As illustrated, it comprises a hopper 12 combined with a feeding elevator 13 and a conditioning or heating cylinder 14. The conditioning or heating cylinder 14 is provided with a coil 23 heating means. The material to be molded, in granular, pellet or other form, is supplied from the hopper 12 to the feeding elevator 13 for delivery to the conditioning or heating cylinder 14 for delivery as at the port 15 of the gate 16. Measured charges of the material are delivered from the feeding elevator 13 to the heating cylinder 14 as by the reciprocating feed rod 17. A connecting lever 21, secured to material charging plunger 18, is attached to feed rod 17, whereby, feed rod 17 is reciprocated in timed relation with material charging plunger 18. Material charging plunger 18 is provided with drive means illustrated as of the hydraulic type, comprising the cylinder 20 having appropriate control valves.

Charges of the molding material are thus advanced into the conditioning or heating cylinder 14 and discharged at the port 15 for injection into the gate 16 for passage to the molding spaces. Gate 16 is provided with open opposite ends. However, the present invention contemplates utilizing one open end at a time.

FIGURE 8 illustrates a cap 9A held in position over one end of gate 16 by means of a bracket 50 to block said end. FIGURE 5 shows a modified form of blocking the same end of gate 16 by means of a plug 9 fastened in gate 16.

Figure 6:
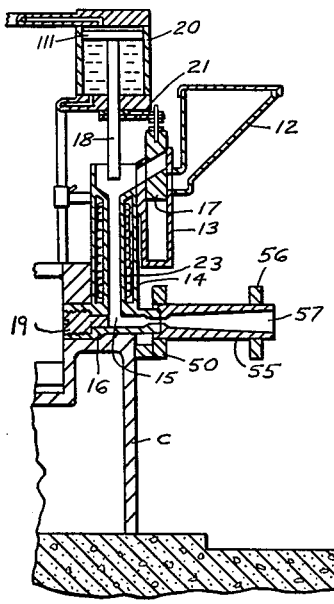
FIGURE 6 is a fragmentary cross sectional view, similar to FIGURE 5 showing the short stroke mold blocked off.

To plug the opposite end of gate 16, a plug 19 is rotatively fastened therein (see FIGURE 6). A throat element 19A replaces plug 19 when cap 9A or plug 9 is in operative position.

Considering now the molding unit or press B; this comprises a stationary end plate or head 30 and an opposite end plate and outer die holder 31. The end plate 30 is mounted in firmly fixed position on basal support C so as to form a part thereof. The end die holder plate 31 is movably supported in tracks 24, 25, formed in base C.

The inner holder plate 33 together with its outer die holder 31 is controlled and operated herein through a toggle mechanism designated generally at 40, disposed between and connected with bosses 41 and 42 on said inner holder plate and on the fixed end plate 30, respectively. Actuation of the toggle mechanism, for advancing, holding closed and retracting the movable die holder 31 is effected as by means of a plunger 43 (see FIGURE 5). Plunger 43 is adapted to be driven in either direction by power applying means such as the hydraulic cylinder 44.

In the particular assembly of the injection means and the press selected for purposes of illustration; the press is shown arranged for offset or overhead injection. In such instance the short stroke die consists of a male part 36 and a female part 37. The male part 36 is provided with the core element 38. The female part 37 is provided with a cavity 39 in registry with the port 15 through gate 16 and throat element 19A.

The short stroke molding machine so far described is known to the art and may be further identified as a Model "L" made by the Lester Phoenix Machine Company of Cleveland, Ohio.

The auxiliary or long stroke attachment 11, applicants contribution to the art, will now be described.

First, throat element 19A will be replaced with plug 19 and cap 9A will be removed from gate 16 to provide one open end thereon. Obviously, if plug 9 construction is being used, plug 9 will be removed.

A bracket 50 is secured to base C as by welding. Two tie bars 51, 52 are secured on one end to bracket 50 and on their other ends to an end plate 53. A stand 54 underlies and is secured to end plate 53 as by welding.

A female mold 55 is secured in bracket 50 and in a support plate 56. Support plate 56 is secured on opposite ends to tie bars 51, 52, respectively. Female mold 55 is held against the end of gate 16 in fluid tight relationship. Female mold 55 is provided with a cavity, core or molding area 57 which is in communication with port 15 through gate 16. A stripper platen 58 provided with an axial orifice 59 is slidably mounted upon tie bars 51, 52, respectively. A core holding platen 60 is also slidably mounted upon tie bars 51, 52. A male die or core element 61 is fixed in core holding platen 60. A hydraulic cylinder 62 is fixed to end plate 53 with its piston rod 64 reciprocatingly passing through end plate 53. Piston rod 64 is fixed to male die or core element 61 at 65, whereby said core element 61 passes into and out of molding area 57.

Reference is made to FIGURES 3 and 4: as piston 90 moves from the position shown and in direction of arrow "M", piston rod 64 will push core holding platen 60 and thereby core element 61 toward and into molding areas 57 a distance as determined in a manner about to be described. The movement of core holding platen 60 toward molding areas 57 will cause core holding platen 60 to engage and slide stripper platen 58 upon tie bars 51, 52 toward female mold 55 until stripper platen engages and is held against the end of female mold 55 in fluid tight relationship (see FIGURE 7). It is obvious that the movement of core holding platen 60 toward female mold 55 causes core element 61 to pass through axial orifice 59.

Core holding platen 60 is provided with a clearance angle surface 60A so that core holding platen 60 will by pass a stop 115 fastened to a rod 116 secured on opposite ends in bracket 50 and end plate 53.

After the molding operation takes place, the molded article, for example a furniture leg, will adhere to core element 61 and in addition the outside diameter of the molded article will be greater than the diameter of axial orifice 59. Therefore, as piston 90 moves in a direction opposite to arrow "M" core holding platen 60, core element 61 and the molded product attached to core element 61 will move away from molding area 57. The end of the molded product will engage stripper platen 58 and simultaneously move it along with core holding platen 60, until stripper platen 58 engages stop 115. As core holding platen 60 and core element 61 continue moving the molded article abutting stripper platen 58 will be detached from core element 61 and be stripped therefrom. It should be obvious that core element 61 must move a distance slightly greater than the length of the molded article to remove the molded article from molding area 57 before stripper platen 58 engages stop 115. Core element 61 must then move a further distance again slightly greater than the length of the molded article to remove the core element 61 from within the molded article.

Where the molded article is of relative long length as herein contemplated, the problem of moving the core element 61 in an absolute horizontal plane, without deviation therefrom, manifests itself. Should core element 61 fail to enter molding area 57 in the exact geometric center thereof, the walls of the molded article would vary in molded thickness and thereby produce an unsatisfactory molded article. FIGURE 3 illustrates a structure which has proven satisfactory.

An air to oil booster cylinder 66 provided with a bracket 67 is secured to end plate 53, as at 68.

Figure 12:
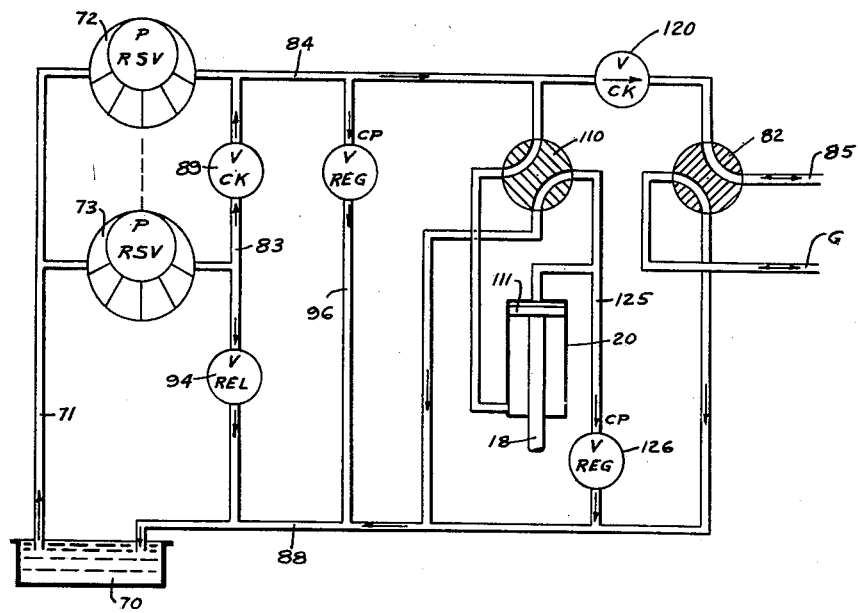
FIGURE 12 is a diagrammatic view of the hydraulic system of the short stroke machine showing that portion of the hydraulic system used in conjunction with the long stroke auxiliary attachment.
Figure 17:
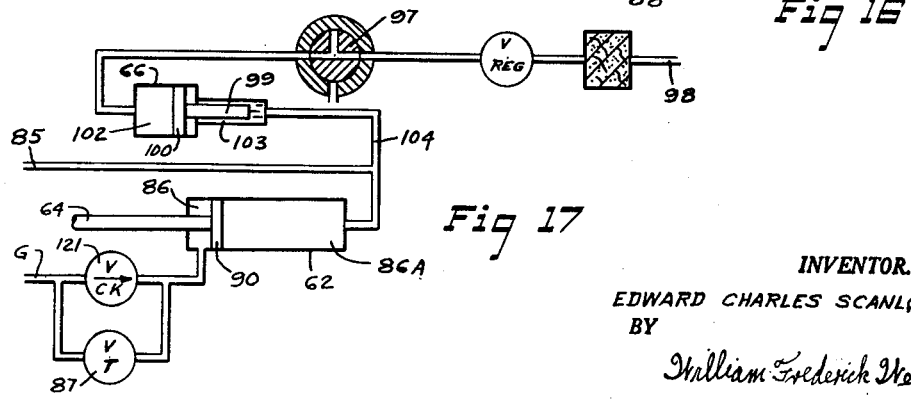
FIGURE 17 is a view similar to FIGURE 13, illustrating the application of clamping pressure to the long stroke mold.

Reference is now directed to FIGURES 12, thru 17, wherein the hydraulic system is illustrated in diagrammatic form. A hydraulic reservoir 70 is provided, see FIGURE 12. A conduit 71 connects rotary, sliding vane pumps 72, 73 with reservoir 70. Pump 72 is a high pressure, low volume pump. Pump 73 is a low pressure, high volume pump. Pumps 72, 73 are mounted upon and are driven by the same shaft (not shown).

The closing of electric switch 80 (FIGURE 14) starts hydraulic cylinder timer 81 which in turn actuates four way valve 82 thru coil 82C to the position shown in FIGURE 12, the fluid transfer position. Low pressure, high volume pump 73 through conduit 83 and high pressure, low volume pump 72 through conduit 84, then force hydraulic fluid through four way valve 82 and conduit 85 to hydraulic cylinder 62 whereby piston rod 64 is actuated to a molding position (direction of arrow "A" FIGURE 13) whereby core 61 is located within cavity or molding area 57.

The movement of piston rod 64 in the direction of arrow "A" forces hydraulic fluid from chamber 86, in hydraulic cylinder 62, through adjustable throttle valve 87 and conduit G, four way valve 82, conduit 88, to reservoir 70. Reservoir 70 is the source of supply of hydraulic fluid for the system.

When the core 61 is fully seated in cavity 57, the piston 90 of piston rod 64 actuates an electric switch 91, whereby the electric timer 92 is activated to start the molding cycle.

The seating of core 61 in cavity 57, limits the movement of the piston rod 64, so that piston 90 causes hydraulic pressure, in effect back pressure, to build up in conduits 85, 84, and 83, through the operation of pumps 72, 73, whereby, the back pressure in conduit 83 actuates relief valve 94 to allow the hydraulic fluid to relieve the pressure by passing through conduit 83 into reservoir 70. Check valve 89 located between conduits 83, 84 prevents fluid pressure in conduit 84 from flowing into conduit 83 when relief valve 94 is actuated to relieve pressure in conduit 83. Pump 72 continues to function, building up hydraulic pressure in conduits 84, 85 until pressure regulator 95 reaches capacity. Upon reaching full capacity, pressure regulator 95 will function to pass excess pressure and fluid through conduits 95, 88 into reservoir 70.

At the start of the molding cycle, electric timer 92, actuates solenoid operated valve 97, thru coil 97C, whereby said valve is turned to a position (ninety degrees from that shown in FIGURE 13 to that position shown in FIGURE 17), whereby, air from a source of supply not shown, in conduit 98 actuates booster piston 99 through piston head 100. Air in chamber 102 acting on piston head 100 moves said piston head in the direction of arrow B to force hydraulic fluid in chamber 103 to pass through conduit 104, whereby the hydraulic fluid in conduit 85 is provided with additional pressure so that piston 90 is more forcefully moved in the direction of arrow A.

Figures 15, 16:
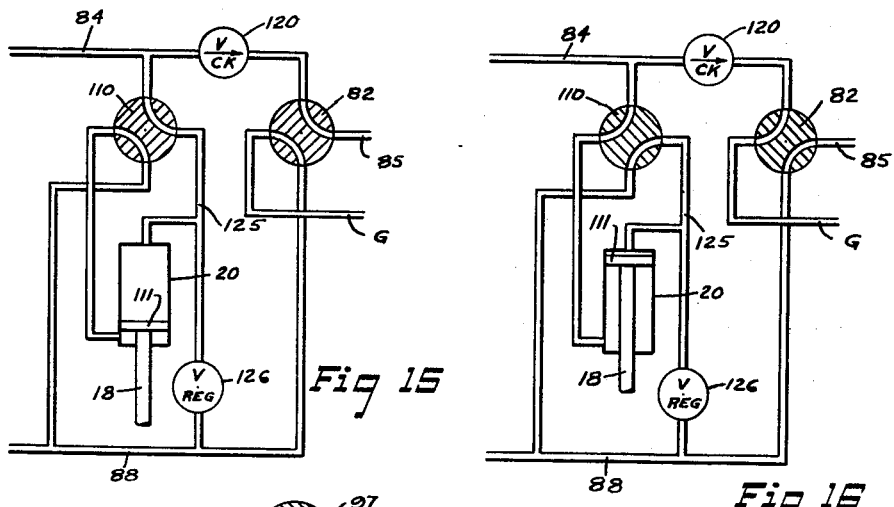
FIGURE 15 is a view similar to FIGURE 12 illustrating the injection cycle.
FIGURE 16 is a view similar to FIGURES 12 and 15, illustrating the opening of the long stroke mold.

Simultaneously, with the actuation of solenoid-operated valve 97, electric timer 92, actuates solenoid-operated four way valve 110 thru coil 110C to the position shown in FIGURE 15, whereby fluid from conduit 84 passes thru four way valve 110 and conduit 125 to cylinder 20 to actuate material charging plunger 18 in an injection stroke. In this way the material is forced into cavity 57. Regulator valve 126 between conduits 125 and 88 limits the amount of pressure applied to piston 111. Check valve 120 located in conduit 84 prevents the high pressure in conduit 85 from passing through conduit 84 to valve 110 and piston 111.

Figure 13:
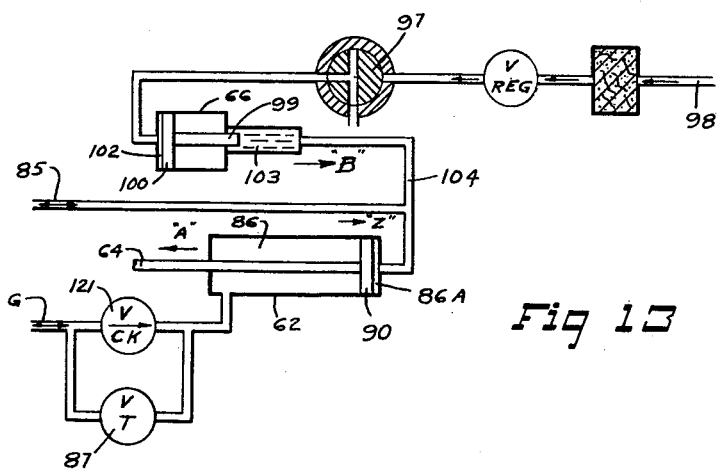
FIGURE 13 is a diagrammatic view of the hydraulic system used in the long stroke auxiliary attachment.

Upon completion of the injection cycle, electric timer 92 actuates four way solenoid valve 110 to the position shown in FIGURE 12, whereby hydraulic fluid from conduit 84 acting on piston 111 of plunger 18, forces plunger 18 to cycle starting position. Simultaneously with the operation of four way solenoid valve 110, solenoid-operated valve 97 is actuated by electric timer 92, to shut off the source of air supply from conduit 98 and to vent the air in chamber 102 to the atmosphere, as illustrated in FIGURE 13.

Hydraulic cylinder timer 81, provides a cooling period for the molten plastic to harden, in its cycle of operation. After the cooling period, timer 81 actuates four way valve 82, to the position shown in FIGURE 16, whereby piston 90 is caused to move in the direction of arrow Z, to the position shown in FIGURE 13. This movement of piston 90 is effected by the operation of pump 72 which forces fluid thru conduit 84 (see FIGURE 12) and thru check valve 120 (see FIGURE 16) to and thru four way valve 82 (in the position shown in FIGURE 16) to conduit G and thereafter (see FIGURE 13), the fluid passes through check valve 121 to chamber 86. The fluid in chamber 86A will be forced thru conduit 85 (see FIGURES 13, 16, and 12) to and thru four way valve 82 and thereby into conduit 88 to reservoir 70. The movement of piston 90 to the position shown in FIGURE 13 causes male die or core 61 to be withdrawn from the mold cavity 57 with the molded product attached to core 61. The end of the molded product is greater in diameter than axial orifice 59. Therefore, the end of the molded product will abut stripper plate 58, sliding stripper 58 upon the rods 51, 52 until stripper plate strikes a stop 115 adjustably secured on a rod 116. In this way, the continued movement of head 90 and core 61 removes the molded product from core 61 whereby core 61 in conditioned to start the next molding cycle.

Figure 14:
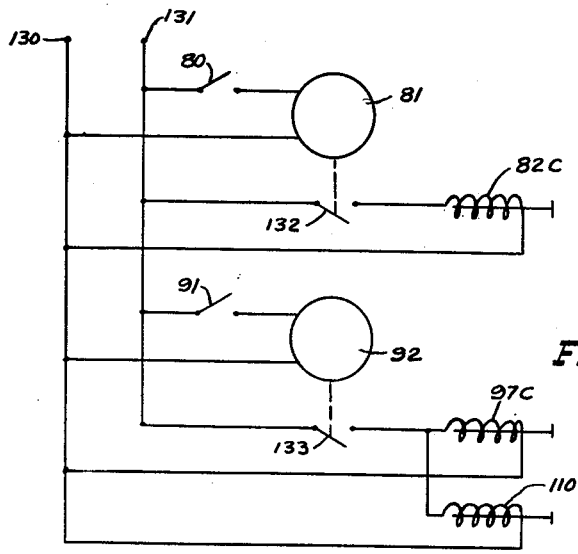
FIGURE 14 is a schematic view of the electrical circuit.

Referring to FIGURE 14, the electrical system functions thru connections 130, 131 which are attached to a source of electrical energy. The manual closing of switch 80 energizes clamp cylinder timer 81 whereby switch 132 is closed by said timer 81. The circuit is then completed to coil 82C which forms part of four way valve 82. Said valve 82 is thereby actuated to the position shown in FIGURE 13 whereby piston 90 and piston rod 64 are actuated by hydraulic fluid to the position shown in FIGURE 17. The movement of piston 90 from the position shown in FIGURE 13 to the position shown in FIGURE 17 actuates to close electrical switch 91. Ejection timer 92 is thereby actuated to close electrical switch 133. In this manner coil 97C is energized to actuate solenoid operated valve 97 from the position shown in FIGURE 13 to the position shown in FIGURE 17.

Simultaneously with the energizing of coil 97C, electrical switch 133 energizes coil 110C whereby four way solenoid valve 110 is actuated from the position shown in FIGURE 12 to the position shown in FIGURE 15.

In its cycle of operation injection timer 92 opens electrical switch 133 to deenergize coils 97C and 110C allowing valves 97 and 110 to return to initial position.

In timed relation with the operation of injection timer 92, clamp cylinder timer 81 operates to open electrical switch 132 to deenergize coil 82C whereby four way valve 82 returns to starting position. The electrical mechanism is now ready to start another cycle.

Having shown and described a preferred embodiment of the present invention by way of example, it should be realized that structural changes could be made and other examples given without departing from either the spirit or scope of this invention.

What I claim is:

1. A plastic molding machine consisting of a base, a heating cylinder secured to said base, a feeding elevator, means securing said feeding elevator to said heating cylinder, a hopper attached to said feeding elevator, a feed rod operable in said feeding elevator, hydraulic means actuating said feed rod whereby a preselected amount of dry material is transferred from said hopper to said heating cylinder by means of said feeding elevator, a gate, secured in said base, a port in said heating cylinder leading to said gate, whereby dry material converted into a fluid condition in said heating cylinder flows through said port into said gate, a long stroke mold attached to said gate in fluid tight relationship, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite ends of said tie rods to said end plate, means slidably mounting said stripper platen and said core holding platen upon said tie rods, said long stroke mold being secured in both said bracket and in said support plate, a hydraulic cylinder having a hydraulically operated piston reciprocatively mounted therein, means securing said hydraulic cylinder to said end plate, a core element secured to said hydraulically operated piston, means securing said core element to said core holding platen, an axial orifice in said stripper platen, said core element reciprocatingly passing through said axial orifice to enter said long stroke mold whereby the molding operation is performed.

2. A plastic molding machine consisting of a base, a vertical heating cylinder provided with a port, a horizontal gate provided with one blocked end and an opening in the other end, said port communicating with said open end, said heating cylinder and said gate being fastened to said base, a feeding elevator, a hopper secured to said feeding elevator, means securing said feeding elevator to said vertical heating cylinder, a feed rod, hydraulic means actuating said feed rod into and out of said feeding elevator whereby said feed rod transfers a preselected amount of dry material from said hopper to said heating cylinder, a horizontal long stroke mold attached in fluid tight relationship to said gate at said open end, dry material converted into fluid by said heating cylinder flows through said port and open end of said gate into said horizontal long stroke mold, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite end of each of said tie rods in said end plate in absolute horizontal alignment, means mounting said stripper platen and said core holding platen upon said tie rods for horizontal sliding movement, said long stroke mold secured in said base and additionally secured in both said bracket and in said support plate in absolute horizontally aligned position, a hydraulic cylinder having a hydraulically operated piston mounted for horizontally reciprocating movement in alignment with said long stroke mold, means securing said hydraulic cylinder to said end plate in horizontally aligned position with said horizontal long stroke mold, a core element secured on one end to said core holding platen in horizontal alignment with said horizontal long stroke mold, means securing said piston to said core element, a horizontal axial orifice in said stripper platen, said hydraulically operated piston reciprocating said core element through said horizontal axial orifice for molding engagement with said horizontal long stroke mold in timed relation with said hydraulic means actuating said feed rod.

3. A plastic molding machine consisting of a base, a vertical heating cylinder secured to said base, a hopper secured to said vertical heating cylinder, a feed rod, means including said feed rod whereby a preselected quantity of molding material is transferred from said hopper to said heating cylinder, a horizontal gate, having one open end, fixed to said base, a port connection between said vertical heating cylinder and said gate whereby the molding material in said vertical heating cylinder may pass into said gate, a horizontal long stroke mold attached to the open end of said gate in fluid tight relationship, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite ends of said tie rods in said end plate in horizontal alignment, means mounting said stripper platen and said core holding platen upon said tie rods for horizontal sliding movement, said long stroke mold secured in said base being secured in both said bracket and in said support plate in horizontal alignment, a hydraulic cylinder, a hydraulically operated piston slidably mounted in said hydraulic cylinder for horizontal reciprocating movement toward and away from said horizontal long stroke mold and in horizontal alignment with said horizontal long stroke mold, means securing said hydraulic cylinder to said end plate in horizontally aligned position, a core element secured on one end to said core holding platen in horizontal alignment with said horizontal long stroke mold, means securing said piston to said core element, a horizontal axial orifice in said stripper platen, said hydraulically operated piston reciprocating said core element through said horizontal axial orifice for molding engagement with said horizontal long stroke mold and for withdrawing said core element from said horizontal long stroke mold, and a rod secured on one end in said bracket and on the other end in said end plate, a stop adjustably secured on said rod, whereby, said stripper platen through engagement of a molded product on said core element slides upon said tie bars to abut said stop, the continued reciprocating movement of said core element stripping the molded product off said core element.

4. A plastic molding machine consisting of a base, a vertical heating cylinder secured to said base, a feeding elevator, a hopper secured to said feeding elevator, means securing said feeding elevator to said vertical heating cylinder, a feed rod, hydraulic means actuating said feed rod whereby said feeding elevator transfers a preselected amount of dry material from said heating cylinder, a horizontal gate fixed in said base, a port in said heating cylinder leading to said gate, whereby dry material converted into a fluid by said heating cylinder flows through said port into said gate, a horizontal short stroke mold attached in fluid tight relationship to one end of said gate, a horizontal long stroke mold attached in fluid tight relationship to the opposite end of said gate, plug means secured in said short stroke mold, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite end of each of said tie rods in said end plate in absolute horizontal alignment, means mounting said stripper platen and said core holding platen upon said tie rods for horizontal sliding movement, said long stroke mold secured in said base and additionally secured in both said bracket and in said support plate in absolute horizontally aligned position, a hydraulic cylinder having a hydraulically operated piston mounted for horizontally reciprocating movement in alignment with said long stroke mold, means securing said hydraulic cylinder to said end plate in horizontally aligned position with said horizontal long stroke mold, a core element secured on one end to said core holding platen in horizontal alignment with said horizontal long stroke mold, means securing said piston to said core element, a horizontal axial orifice in said stripper platen, said hydraulically operated piston reciprocating said core element toward and away from said horizontal long stroke mold in a molding cycle in timed relation with said hydraulic means actuating said feed rod, a rod secured on one end in said bracket and on the other end in said end plate, said stripper plate slidably mounted on said rod, a stop adjustably secured on said rod, whereby said stripper platen moves toward said horizontal long stroke mold through engagement with said core holding platen and through engagement of the molded product on said core element moves away from said horizontal long stroke mold to abut said stop whereby the molded product disengages said core element and a hydraulic booster connected to said hydraulic cylinder whereby actuation of said hydraulic booster in timed relation with the hydraulic means actuating said feed rod additional hydraulic pressure to said hydraulic operated cylinder.

5. A plastic molding machine consisting of a base, a heating cylinder secured to said base, a feeding elevator, means securing said feeding elevator to said heating cylinder, a hopper attached to said feeding elevator, a feed rod operable in said feeding elevator, hydraulic means actuating said feed rod whereby a preselected amount of dry material is transferred from said hopper to said heating cylinder by means of said feeding elevator, a gate, secured in said base, a port in said heating cylinder leading to said gate, whereby dry material converted into a fluid condition in said heating cylinder flows through said port into said gate, a short stroke mold attached to one end of said gate, a long stroke mold attached to the opposite end of said gate in fluid tight relationship, plug means secured in said short stroke mold, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite ends of said tie rods to said end plate, means slidably mounting said stripper platen and said core holding platen upon said tie rods, said long stroke mold being secured in both said bracket and in said support plate, a hydraulic cylinder having a hydraulically operated piston reciprocatively mounted therein, means securing said hydraulic cylinder to said end plate, a core element secured to said hydraulically operated piston, means securing said core element to said core holding platen, an axial orifice in said stripper platen, said core element reciprocatingly passing through said axial orifice to enter said long stroke mold whereby the molding operation is performed.

6. A plastic molding machine including a base and a horizontal gate having an open end for the passage of molding material, a horizontal long stroke mold attached to the open end of said gate in fluid tight relationship, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite ends of said tie rods in said end plate in horizontal alignment, means mounting said stripper platen and said core holding platen upon said tie rods for horizontal sliding movement, said long stroke mold secured in said base being secured in both said bracket and in said support plate in horizontal alignment, a hydraulic cylinder, a hydraulically operated piston slidably mounted in said hydraulic cylinder for horizontal reciprocating movement toward and away from said horizontal long stroke mold and in horizontal alignment with said horizontal long stroke mold, means securing said hydraulic cylinder to said end plate in horizontally aligned position, a core element secured on one end to said core holding platen in horizontal alignment with said horizontal long stroke mold, means securing said piston to said core element, a horizontal axial orifice in said stripper platen, said hydraulically operated piston reciprocating said core element through said horizontal axial orifice for molding engagement with said horizontal long stroke mold and for withdrawing said core element from said horizontal long stroke mold, and a rod secured on one end in said bracket and on the other end in said end plate, a stop adjustably secured on said rod, whereby, said stripper platen through engagement of a molded product on said core element slides upon said tie bars to abut said stop, the continued reciprocating movement of said core element stripping the molded product off said core element.

7. A plastic molding machine consisting of a base, a horizontal gate provided with an opening, a feeding elevator, means securing said feeding elevator to said base a feed rod, hydraulic means actuating said feed rod into and out of said feeding elevator to transfer a preselected amount of material from said feeding elevator to said horizontal gate, a horizontal long stroke mold attached in fluid tight relationship to said gate at said open end, dry material converted into fluid by said heating cylinder flows through said port and open end of said gate into said horizontal long stroke mold, a bracket secured to said base, a stand remotely located from said base, an end plate provided with an axial clearance orifice, means securing said end plate to said stand, a support plate, a stripper plate, a core holding platen and two horizontally and oppositely located tie rods, means securing one end of each of said tie rods to said bracket, and means securing the opposite end of each of said tie rods in said end plate in absolute horizontal alignment, means mounting said stripper platen and said core holding platen upon said tie rods for horizontal sliding movement, said long stroke mold secured in said base and additionally secured in both said bracket and in said support plate in absolute horizontally aligned position, a hydraulic cylinder having a hydraulically operated piston mounted for horizontally reciprocating movement in alignment with said long stroke mold, means securing said hydraulic cylinder to said end plate in horizontally aligned position with said horizontal long stroke mold, a core element secured on one end to said core holding platen in horizontal alignment with said horizontal long stroke mold, means securing said piston to said core element, a horizontal axial orifice in said stripper platen, said hydraulically operated piston reciprocating said core element through said horizontal axial orifice for molding engagement with said horizontal long stroke mold in timed relation with said hydraulic means actuating said feed rod.

References Cited by the Examiner

UNITED STATES PATENTS

| 1,952,241 | 3/34 | Eckert | 18—30 |
| 2,115,590 | 4/38 | Ryder | 18—30 |
| 2,262,615 | 11/41 | Lester | 18—30 |

FOREIGN PATENTS 569,155  5/45  Great Britain.

MICHAEL V. BRINDISI, *Primary Examiner.*